Patented Aug. 27, 1929.

1,725,927

UNITED STATES PATENT OFFICE.

GEORG KRÄNZLEIN, HEINRICH VOLLMANN, AND KARL WILKE, OF HOCHST-ON-THE-MAIN, GERMANY, ASSIGNORS TO GENERAL ANILINE WORKS, INC., OF NEW YORK, N. Y., A CORPORATION OF DELAWARE.

ALPHA-ANTHRAQUINONYL KETONES AND PROCESS OF PREPARING SAME.

No Drawing. Application filed May 24, 1927, Serial No. 193,946, and in Germany May 25, 1926.

The present invention relates to alpha-anthraquinonyl-ketones and to a process of preparing the same.

We have found that by causing chromic acid to act in glacial acetic acid solution at an elevated temperature upon a benzanthrone in which at least one of the H atoms in the Bz-1 and Bz-2 positions is substituted by a radical of the group including alkyl, aryl, acyl, aroyl, nitrile and carboxyl, the Bz-ring is split up and alpha-anthraquinonyl-ketones are formed.

In this manner there is obtainable by the oxidation of, for instance, Bz-1-phenylbenzanthrone the 1-benzoylanthraquinone, by the oxidation of Bz-1-benzanthronylbenzanthrone (Bz-1-Bz-1'-dibenzanthronyl) the hitherto unknown benzil of the anthraquinone series (diphthaloylbenzil) and by the oxidation of Bz-1-hydroxy-Bz-2-phenylbenzanthrone the monophthaloylbenzil which is also not yet known. The oxidation occurs, for instance in the case of the Bz-1-benzanthronylbenzanthrone, probably according to the following scheme:

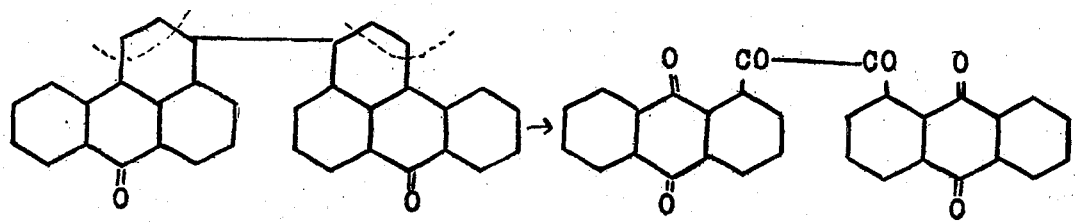

Furthermore by a moderate oxidation of the Bz-1-methylbenzanthrone the hitherto unknown 1-acetylanthraquinone is obtained, having the following formula:

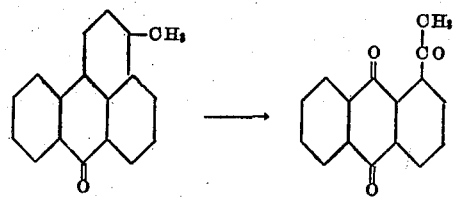

In the case of Bz-1-benzoylbenzanthrone most probably the reaction occurs as follows:

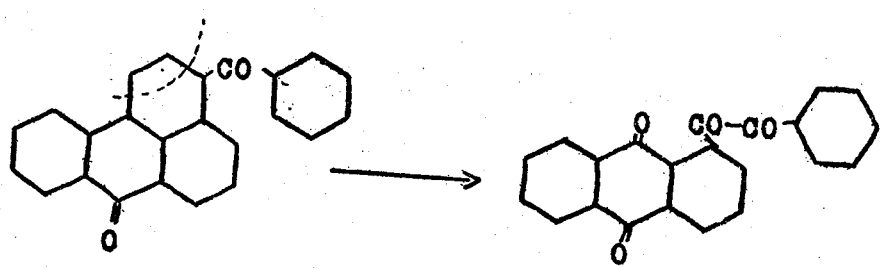

The alpha-anthraquinonyl-ketones produced by the above described process are intended to be used as intermediate products for the preparation of dyestuffs. Whereas some of the products obtainable by our new process are known, the compounds of the general formula—

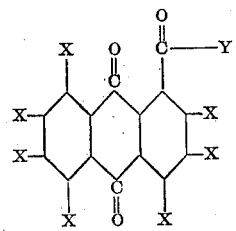

wherein X represents hydrogen of a univalent substituent and Y represents a radical of the group including alkyl,—CO-alkyl,—CO-phenyl,—CO-anthraquinonyl, have not been hitherto described.

The following examples serve to illustrate our invention, but are not intended to limit it thereto; the parts being parts by weight:

1. 10 parts of Bz-1-phenylbenzanthrone (produced according to U. S. Patent 1,705,868) are dissolved at boiling heat in 80 parts of glacial acetic acid and there is gradually introduced so much of chromic acid in a solid form until a test sample of the mass, when dissolved in concentrated sulfuric acid, shows a pure yellow color. The mass is then diluted while hot with 20 parts of water and allowed to cool, whereupon the oxidation product, which has formed with a good yield, separates as feebly yellow needles. The product melts at 229° C. and possesses properties attributed to the α-benzoylanthraquinone described by Schaarschmidt (see Berichte der Deutschen Chem. Gesellschaft, vol 48, page 837).

2. 10 parts of Bz-1-Bz-1'-dibenzanthronyl, are suspended in 200 parts of boiling glacial acetic acid and into this suspension are gradually introduced 40 parts of chromic acid. After having boiled the mass for a short time, it is diluted with some water, the resulting precipitate is filtered and washed. The residual product contains practically no carboxylic acid. After recrystallization from nitrobenzene, an almost colorless crystalline powder is obtained which, after assuming a dark coloration, melts at 330–331° C. with decomposition. The substance so obtained is very sensitive to light; it soon assumes even in diffused daylight a brown color. Concentrated sulfuric acid dissolves it sparingly in the cold; when slightly heated, it passes into a carmine-red solution. On addition of water, the dyestuff is precipitated as red flakes which become dark-green on being washed.

3. 10 parts of Bz-1-hydroxy-Bz-2-phenyl-benzanthrone produced according to Example 16 of U. S. Patent 1,705,868, are brought into a fine suspension in 100 parts of glacial acetic acid and into this suspension is gradually introduced at boiling heat a concentrated solution of chromic acid in glacial acetic acid until a test sample, dissolved in concentrated sulfuric acid, no longer shows a blue, but a pure yellow solution. This solution is diluted with a small quantity of water and is then allowed to cool, whereupon the oxidation product separates. The latter is filtered by suction and washed. The product, when recrystallized from toluene, forms feebly yellow coarse prisms of melting point 181° C. Its solution in concentrated sulfuric acid is of a yellow color which, on addition of some copper powder, turns pure blue. When exposed to light, even for only a short time, the substance assumes a bluish-black color. The reaction proceeds most probably according to the following equation:

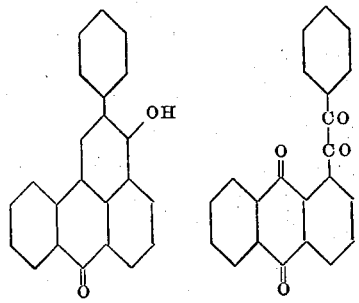

If the oxidation is not carried out to such a great extent, a body is obtained which crystallizes from glacial acetic acid in almost colorless laminæ. It melts, after previously assuming a dark coloration, at 237° C. The body dissolves in concentrated sulfuric acid to a blue solution which is red when looking through the solution, on heating, the solution changes to a red color with an intense red fluorescence. There could not be observed any sensitiveness of this body to light.

4. 20 parts of Bz-1-methylbenzanthrone (produced according to Example 1 of U. S. patent application Ser. No. 180,055, filed March 31st, 1927) are dissolved in 200 parts by volume of glacial acetic acid and into this solution are introduced by portions 45 parts of chromic acid. After precipitating the mass with water, the residue is extracted with a diluted solution of sodium carbonate in order to remove any carboxylic acids which may have formed. There remains an almost colorless crystalline residue which crystallizes from glacial acetic acid in feebly yellow needles of melting point 160° C. Its solution in concentrated sulfuric acid has a yellow color which on addition of copper powder turns green. The compound gives a brown-reddish vat and, when shaken out with air, separates again in crystals.

5. 30 parts of Bz-2-methylbenzanthrone of melting point 168° C (produced according to Example 3 of U. S. Patent 1,695,626) are suspended, while cold, in 400 parts of glacial acetic acid and there are then added thereto 60 parts of chromic acid. The mixture becomes spontaneously heated to boiling.

After about 2 minutes it is diluted with a small quantity of water, whereupon the oxidation product which has formed, separates in feebly yellow matted needles. Its melting point is near 195° C. Its solution in concentrated sulfuric acid shows a yellow color which turns violet-red on addition of copper powder. The body, when exposed to light, soon gets a blue color. It gives a blue vat. In view of the manner in which it is formed, it may be regarded as being α-anthraquinonyl-methyl-1.2-diketone of the formula:

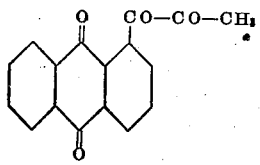

6. When treated in a manner similar to that set forth in the foregoing example, Bz-1.2-dimethylbenzanthrone (produced according to Example 3 of U. S. Patent 1,705,868) yields chiefly α-acetylanthraquinone of melting point 160° C., besides a small quantity of the anthraquinonyl-methyl-diketone described in Example 6 which is sensitive to light.

7. 50 parts of Bz-1-benzanthrone nitrile (produced according to the process described in U. S. Patent No. 1,628,280 issued May 10, 1927) are suspended in 500 parts of glacial acetic acid and there are then added thereto by portions and at boiling heat 200 parts of chromic acid. On filtering by suction an almost colorless crystalline residue is left. On recrystallizing the mass from a large quantity of nitrobenzene an almost colorless feebly-grey crystalline powder is obtained. The body melts, after having previously assumed a dark color, at 297° C. with decomposition. Its solution in concentrated sulfuric acid shows a yellow color without any fluorescence, which, on addition of copper powder, turns green.

On adding water to the mother liquor used for the oxidation process another body is precipitated which crystallizes from nitrobenzene in yellowish laminæ melting at 276–277° C. This body dissolves in concentrated sulfuric acid to a yellow solution with a green fluorescence. Its constitution has not yet been ascertained.

8. 10 parts of Bz-1-benzoylbenzanthrone (produced for instance from Bz-1-benzanthronecarboxylic acid chloride with benzene and aluminium chloride—melting point 195° C.—) are dissolved at boiling heat in 100 parts of glacial acetic acid and into this solution are gradually added so much of solid chromium trioxide that a test sample dissolved in concentrated sulfuric acid no longer shows any fluorescence. The mass is then diluted, while hot, with 40 parts of water and allowed to cool. The oxidation product separates in the form of almost colorless feebly yellow needles. It melts at 180° C. and is identical with the product obtainable according to Example 4 which may probably be regarded as being monophthaloylbenzil.

We claim:

1. The process for preparing 1-anthraquinonyl ketones, which consists in causing chromic acid to act upon a benzanthrone at an elevated temperature in glacial acetic acid solution, in which benzanthrone at least one of the H atoms in the Bz-1 and Bz-2 positions is substituted by a radical of the group including alkyl, aryl, acyl, aroyl, nitrile, and carboxyl.

2. The process for preparing 1-acetyl-anthraquinone, which consists in causing chromic acid to act upon Bz-1-methylbenzanthrone at an elevated temperature in glacial acetic acid solution.

3. As new products anthraquinone compounds having the general formula:

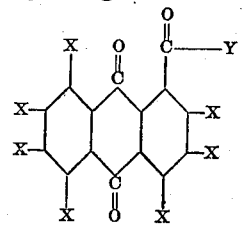

wherein X represents hydrogen or a univalent substituent and Y represents a radical of the group consisting of alykyl, −CO.alkyl,−CO.phenyl and−CO.anthraquinonyl, which compounds melt between 150 and 350° C.

4. As new products anthraquinone compounds having most probably the formula:

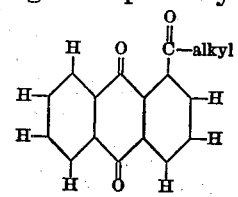

which compounds are feebly colored products melting between 150 and 350° C.

5. As a new product, 1-acetylanthraquinone compound having most probably the formula:

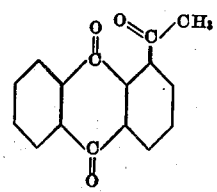

which compound crystallizes from glacial acetic acid in feebly yellow needles having a melting point of 160° C., and is soluble in concentrated sulfuric acid with a yellow coloration which upon addition of copper powder turns green.

6. The process for preparing 1-anthraquinonyl-ketones, which consists in causing chromic acid to act upon a benzanthrone in boiling glacial acetic acid solution, in which benzanthrone at least one of the H atoms in the Bz-1 and Bz-2 positions is substituted by a radical of the group including alkyl, aryl, acyl, aroyl, nitrile and carboxyl.

7. The process for preparing 1-anthraquinonyl-ketones, which consists in causing chromic acid to act in boiling glacial acetic acid solution upon a benzanthrone being substituted in the Bz-1 position by a radical of the group including alkyl, aryl, acyl, aroyl, nitrile and carboxyl.

8. The process which comprises dissolving about 20 parts by weight of Bz-1-Bz-1-methyl-benzanthrone in about 200 parts by volume of glacial acetic acid and introducing into this solution about 45 pounds of chromic acid.

In testimony whereof we affix our signatures.

GEORG KRÄNZLEIN.
HEINRICH VOLLMANN.
KARL WILKE.